United States Patent [19]

Durbye

[11] Patent Number: 4,509,457

[45] Date of Patent: Apr. 9, 1985

[54] ANIMAL LITTER AND PROCESS FOR THE PRODUCTION THEREOF

[75] Inventor: Hartmut Durbye, Kirchlinteln-Luttum, Fed. Rep. of Germany

[73] Assignee: Mars Inc., McLean, Va.

[21] Appl. No.: 383,010

[22] Filed: May 28, 1982

[30] Foreign Application Priority Data

May 29, 1981 [DE] Fed. Rep. of Germany ....... 3121403

[51] Int. Cl.$^3$ .............................................. A01K 1/015
[52] U.S. Cl. ....................................................... 119/1
[58] Field of Search ............................ 119/1; 424/357

[56] References Cited

U.S. PATENT DOCUMENTS

| | | | |
|---|---|---|---|
| 3,029,783 | 4/1962 | Sawyer et al. | 119/1 |
| 3,059,615 | 10/1962 | Kuceski et al. | 119/1 |
| 3,747,564 | 7/1973 | Bickoff et al. | 119/1 |
| 3,789,797 | 2/1974 | Brewer | 119/1 |
| 3,921,581 | 11/1975 | Brewer | 119/1 |
| 4,275,684 | 6/1981 | Krämer et al. | 119/1 |

FOREIGN PATENT DOCUMENTS 2298272  8/1976  France .................................. 119/1

*Primary Examiner*—Robert P. Swiatek
*Attorney, Agent, or Firm*—Marshall, O'Toole, Gerstein, Murray & Bicknell

[57] ABSTRACT

The invention relates to animal litter or bedding made from or in conjunction with a porous material, as well as to a process for the production thereof, the pH value of porous materials being adjusted to between approximately 5.0 to approximately 9.0 in the end product by treatment with liquid or gaseous acid substances in order to obtain an optimum smell reducing action.

20 Claims, No Drawings

ANIMAL LITTER AND PROCESS FOR THE PRODUCTION THEREOF

The invention relates to animal litter or bedding material, produced from or in conjunction with a porous material, together with a process for the production thereof.

In the case of known materials for the production of animal litter, they are mainly natural products having a mineral or organic origin, such as pumice, clay material such as e.g. alumina, fire clay and the like, wood flour, peat and kieselguhr which, as a result of their porous structure, are able to absorb liquids in the said pores.

For example, DAS No. 2,902,079 discloses such an animal litter, in whose production porous material with a porous structure is used. The porous matrial used therein is a calcium silicate granular material having a pH value of generally 8.7 to 10.

The known animal litter made from calcium silicate granular material with a pore radius of less than 500 nm is stable as regards shape and consistency and has a bactericidal action.

However, during prolonged use of such materials an unpleasant smell is given off, so that it is frequently necessary to change the litter, although the absorption characteristics thereof are not really exhausted.

The problem of the invention is therefore to improve known animal litter materials in such a way that it is possible to prevent undesired smells which occur even when such materials have been used for a short time, and as a result permit a longer use of the litter.

According to the invention, this problem is solved by a porous material, whose pH value is between approximately 5.0 and approximately 9.0, preferably between approximately 5.8 to 6.2.

The invention also relates to a process for producing such a material in which the porous material is treated with a gaseous or liquid acid substance.

As a result of this novel treatment of per se known materials using substances whose pH value drops to a weak acid range, it has surprisingly proved possible to bring about an unexpected reduction of the smell.

Particularly in view of the fact that e.g. cat's urine, which is weakly acid, is not prevented from giving off a smell after prolonged use by neutral to weak basic adsorbents, it was very surprising that such a reduction of the smell resulted from lowering the pH value to a weak acid range.

It has proved particularly advantageous to use the calcium silicate granular material with a uniform pore size distribution described in DAS No. 2,902,079 as the porous material, which is set to the desired pH value by exposing to an atmosphere containing gaseous acid substances or by spraying with acid solutions and subsequent drying.

Other porous materials, such as e.g. clays and the like can also be used. It is also possible to add to the animal litter according to the invention further deodorants, perfume oils and the like.

It is also possible to add to the animal litter according to the invention colour indicator systems, which indicate the decline in effectiveness of the material.

Further features and advantages of the invention can be gathered from the following description in which specific embodiments are described.

EXAMPLE 1

The animal litter according to the invention was produced by using as the starting material commercial alumina with a particle size between 2 to 5 mm, conveyed by a conveyor belt in uniform quantity to an oblique proportioning screw. A solution of phosphoric acid was sprayed onto the surface of the alumina particles at the transition point from the conveyor belt to the proportioning screw using a spray nozzle system during the free fall of the product.

A uniform wetting of the carrier material surface resulted from the rotary movement of the proportioning screw. The quantity to be sprayed on it is adjusted by continuous control of the pH value in the finished product, so that the pH value is in the range between approximately 5 and approximately 7.

The product is then dried in a rotary drier to a residual moisture content of less than 10%, whilst setting a drying temperature of approximately 210° C.

A non-tacky, dry, odourless product is obtained having good absorption characteristics, particularly for cat's urine.

EXAMPLE 2

Production of calcium silicate granular material suitable as cat's litter 50.4 to 57.0% by weight of quartz powder with a particle size below 100 mm, 29.0 to 42.0% by weight of quicklime and 7.6 to 16.5% by weight of calcium hydroxide were processed to granulated calcium silicate in the manner described in DAS No. 2,902,079. The finished product has an alkaline pH value in the range 8.7 to 10.

Treatment of the calcium silicate granular material for reducing the pH value

The thus produced calcium silicate granular material is crushed to a particle size between approximately 2 and 5 mm, screened and dedusted. The thus produced calcium silicate particles are conveyed by means of a conveyor belt in uniform manner to an oblique proportioning screw (obliquity approximately 40%).

An acid solution is sprayed onto the surface of the calcium silicate particles by means of a spray nozzle at the transition point from the conveyor belt to the proportioning screw.

The spraying solution consists of 31% by weight of a 95% phosphoric acid solution mixed with 69% by weight of an aluminum sulphate solution having a density of 1.30 to 1.34 and a pH value between 2 and 3.5.

The quantity of liquid to be sprayed on is regulated by continuous control of the end product, so that the latter has a pH value between 5.8 and 6.2.

After passing through the proportioning screw, in which the surface of the calcium silicate particles is uniformly wetted, the treated granular material is transferred into a rotary drier. At a drying temperature of approximately 210° C., drying takes place to an end product residual moisture content of less than 10%.

The thus produced, treated calcium silicate granular material has superior properties, particularly with respect to cat's urine compared with known animal litter materials.

Apart from those specifically described in examples 1 and 2 in connection with the production of the animal litter according to the invention, it is also possible to use other salts or acids for obtaining an acid pH value.

It is also possible to acidify such substances by treating with acid gases, e.g. sulphur trioxide, hydrochloric acid gas or other acids in gaseous form, which can optionally be carried out particularly inexpensively when such acid gases are available from other chemical processes.

The inventive features disclosed in the description and claims may be essential to the realisation of the different embodiments of the invention either individually or in random combination.

I claim:

1. Animal litter comprising an odor-suppressing granular or powder porous inorganic material which has been uniformly contacted with a gaseous or liquid acidic substance to neutralize alkalinity therein and impart to said inorganic material a weakly acidic pH between approximately 5.8 and 6.2, and said litter characterized by exhibiting good adsorption for odors from animal excrement having a pH in the weak acid range.

2. Animal litter according to claim 1, characterized in that the porous material is calcium silicate granules and/or powder.

3. Animal litter according to claim 2, characterized in that the pore radii of the calcium silicate granules are below 60 nm and particularly in the range between approximately 10 and 20 nm.

4. Animal litter according to claim 2, characterized in that the acidic substance used for treating the porous inorganic material is gaseous and/or liquid or liquid-dissolved acid compounds and/or mixtures thereof.

5. Animal litter according to claim 4, characterized in that the acid substance consists of gases or gaseous mixtures with HCl, $SO_3$, $H_3COOH$.

6. Animal litter according to claim 4, characterized in that the acid substance is a liquid acid material.

7. Animal litter according to claim 6, characterized in that the liquid acid material is selected from the group consisting of acids, solvent-dissolved acids and/or acid reacting salts and mixtures thereof.

8. Animal litter according to claim 6, characterized in that the liquid acid material is an aqueous solution containing phosphoric acid.

9. Animal litter according to claim 6, characterized in that the inorganic material is calcium silicate granules and the acid material is an inorganic substance.

10. Animal litter comprising calcium silicate granules and/or powder material having a pH value range between approximately 5.8 and 6.2, characterized in that the said pH value is provided in said inorganic porous material by the treatment thereof with a gaseous and/or liquid dissolved acid substance consisting of a mixture of phosphoric acid and aluminum sulphate dissolved in water and subsequent drying.

11. Animal litter according to claim 10, characterized in that the acid substance is a mixture of 21% by weight of 85% phosphoric acid solution and 69% by weight of an aluminum sulphate solution with a pH value between approximately 2 and 3.5 and a specific density of 1.30 to 1.34.

12. Animal litter according to claim 11, characterized in that the calcium silicate granules treated with the acid substance is dried to a residual moisture content below 10%.

13. A process for making an animal litter comprising contacting dedusted classified porous calcium silicate granulate material with a liquid acid substance and thereafter drying, characterized by spraying said material with said liquid acid substance while said material is at a temperature between approximately 20° C. and 30° C. and a moisture content of approximately 25% during free fall into a proportioning screw to effect uniformly wetting and then drying to a residual moisture content below 10%.

14. Process according to claim 13, characterized in that the liquid acid substance used is a mixture of 31% by weight of 85% phosphoric acid solution and 69% by weight of an aluminum sulphate solution having a specific density of 1.30 to 1.34 and a pH value of 2 to 3.5.

15. Process according to claim 13 or 14 characterized in that said drying is effected in a rotary dryer at a drying temperature of approximately 210° C.

16. A process according to claim 25 characterized in that the liquid acid substance is an aqueous solution containing phosphoric acid.

17. In a process for making an inorganic animal litter adapted for suppressing odors from acidic animal excrement, the improvement comprising; uniformly contacting a porous inorganic material selected from the group consisting of calcium silicate granulate and/or calcium silicate powder having an alkaline pH with a gaseous or liquid acidic substance which reacts with said porous inorganic material to neutralize tha alkalinity thereof and form an acidic inorganic litter material having a pH value between approximately 5.8 and 6.2.

18. A process according to claim 17, characterized in that the gaseous acidic substance is selected from the group consisting of HCL, $SO_3$, $H_3COOH$ and gaseous mixtures thereof.

19. A process according to claim 17 characterized in that the liquid acid substance is selected from the group consisting of concentrated and dilute acids and dissolved acid salts or mixtures thereof.

20. Process according to claim 17 characterized in that the porous inorganic material is calcium silicate granulate having pore radii below 60 nm and particularly in the range of approximately 10 to 20 nm.

* * * * *